United States Patent [19]

Süfke

[11] Patent Number: 4,793,112
[45] Date of Patent: Dec. 27, 1988

[54] FACADE PLATE COMPOSED OF A COMPOSITE GLASS STRUCTURE

[75] Inventor: Hans J. Süfke, Bochum, Fed. Rep. of Germany

[73] Assignee: Flachglas Aktiengesellschaft, Furth, Fed. Rep. of Germany

[21] Appl. No.: 173,731

[22] Filed: Mar. 25, 1988

[51] Int. Cl.[4] .............................................. E04B 1/60
[52] U.S. Cl. ................................ 52/309.14; 52/511; 52/765
[58] Field of Search ............... 52/309.1, 306, 506, 52/307, 511, 789, 765, 775, 716, 787

[56] References Cited

U.S. PATENT DOCUMENTS

| | | | |
|---|---|---|---|
| 1,813,790 | 7/1931 | Wildish | 52/506 X |
| 4,312,165 | 1/1982 | Mizusawa | 52/511 |
| 4,324,373 | 4/1982 | Zibritosky | 52/397 X |
| 4,581,867 | 4/1986 | McCann | 52/235 X |
| 4,717,301 | 1/1988 | Oddenino | 52/511 X |

Primary Examiner—David A. Scherbel
Assistant Examiner—Lan Mai
Attorney, Agent, or Firm—Herbert Dubno

[57] ABSTRACT

A composite glass facade plate or panel has bores formed directly in an inner glass pane thereof through which fastening screws pass via the intermediary of sleeves or bushings. The bores are undercut and the screws have heads complementary to the undercut. Hangers, brackets or the like are affixed to the shanks of the screws projecting from the inner surfaces of the panels.

11 Claims, 1 Drawing Sheet

FACADE PLATE COMPOSED OF A COMPOSITE GLASS STRUCTURE

FIELD OF THE INVENTION

My present invention relates to a facade plate in the form of a composite glass structure, i.e. two glass panes permanently bonded together by a layer of a bonding synthetic resin. More particularly, the invention relates to improvements in the means for mounting facade plates of that type on a building structure or frame.

BACKGROUND OF THE INVENTION

It is known to provide facade or facing plates or panels for building structures which are adapted to form the outer skin thereof by mounting such plates or panels on a skeleton or framework formed by the building structure so that the exterior of that building, or its facade, will have the desired esthetic effect.

It is known further in this connection to provide such panels of colored glass so that the facade will have a particular color and reflectance properties determined by the glass or the laminated construction of the composite forming the panels. Naturally, it is desirable to so mount the facade panels so that the supporting structure behind it will be invisible.

Composite glass panels of the type described have generally had an outer glass pane coextensive with an inner glass pane and a foil or other adhesive synthetic resin layer, e.g. applied as a melt or in a liquid condition, over the entire surfaces of the two glass panes for direct bonding to them and joining the two glass panes in the composite glass structure.

The synthetic resin layer was generally composed of polyvinyl butyral.

In the past, the means for mounting such facade plates or panels on the building structure have generally included fastening profiles or strips engaging edges or corners or the rectangular panel and which remained visible although the means for attachment of such strips to the panel were obscured by the panel itself. Nevertheless such attachment strips disturb the esthetic characteristic of the facade formed by the panels and the optical impression given by the entire facade.

OBJECTS OF THE INVENTION

It is, therefore, the principal object of my present invention to provide an improved mounting structure for facade panels or plates of the composite glass type which does not require visible elements along the edges or corners of the panels and which therefore is free from the drawbacks of the earlier systems as described.

Another object of this invention is to provide an improved facade plate or panel which can be easily mounted to the building structure or framework and which nevertheless provides an esthetically pleasing facade arrangement.

SUMMARY OF THE INVENTION

These objects and others which will become apparent hereinafter are attained, in accordance with the invention, by providing a facade panel or plate which comprises an outer visible glass pane or sheet, an inner glass pane or sheet turned toward the building structure upon which the composite panel is to be mounted, and a layer of bonding synthetic resin coextensive with the two glass panes and bonding them together in the composite structure.

According to the invention the inner glass pane is formed directly with at least two bores which are undercut so that these bores converge from the interface between the inner glass pane and the bonding synthetic resin to the inner surface of the inner glass pane. Each of these bores receives a sleeve or bushing within which a metallic fastening element is form fittingly received. Other fastening members, such as brackets, hangers or the like, can be mounted on these metallic fastening elements.

The invention is based upon my surprising discovery that by providing a bushing whose external contour is that of the rotationally symmetrical undercut bore, the load-bearing bore can be formed directly in the inner glass pane and yet can receive, indirectly as indicated, the metallic fastening element without any detriment to the strength and stability of the inner or wall-side glass pane and the panel as a whole.

The fattening structure or assembly thus formed can readily take up all of the stresses which may apply in the mounted state of the panel, especially the weight and wind-force stresses.

Best results have been achieved, in this regard, when at least one of the glass panes, especially the inner or wall-side glass pane, is provided as a single-sheet safety glass.

The undercut bores preferably have a frustoconical configuration like that of countersunk bores. It is also possible, however, to operate with a form of bayonet construction.

Mention should be made of the fact that facade panels using two plates are described in German Pat. No. 732,014, but here the inner plate receives an insert in which the undercut bore is formed. In this system, therefore, the glass pane must be provided with a cutout or opening to receive the insert which is a synthetic resin plate cemented into the recess. It is indeed surprising that such cutouts and inserts are not required in accordance with principles of the invention.

The coloration and any optical reflective or like characteristics of at least the outer or visible glass pane makes the entire mounted assembly including the bores and fastening elements in the inner or wall-side glass pane totally invisible.

The wall-side glass pane can have three such assemblies (bores, bushings and fastening elements) in a statically determined spacing to form a statically determined fastening aggregate or unit.

Alternatively, four such assemblies can be provided, one each at each corner on the panel.

The sleeves or bushings can be preformed sleeve members or can be cast in place, e.g. of a synthetic resin material. Alternatively, the sleeve or bushing can be composed of a relatively soft metal for example lead. The fastening elements may be screws or the like which can have frustoconical heads complementary to the bores and the sleeves or bushings interposed between the bores and these heads. Threaded shanks can project rearwardly from the rear or inner surface of the inner glass pane.

BRIEF DESCRIPTION OF THE INVENTION

The above and other objects, features and advantages of my invention will become more readily apparent from the following description, reference being made to the accompanying highly schematic drawing in which.

SPECIFIC DESCRIPTION

Figure 1:
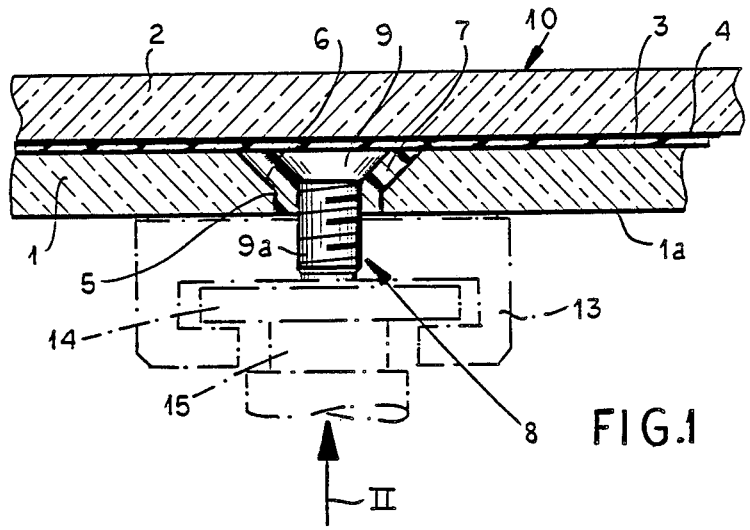
FIG. 1 is a cross sectional view through a facade plate according to the invention.
Figure 2:
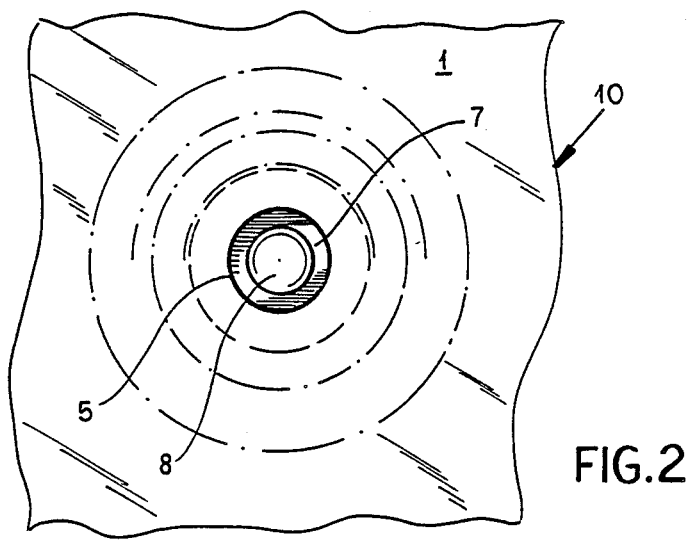
FIG. 2 is a fragmentary elevational view in the direction of arrow II in FIG. 1.

The facade panel 10 illustrated in FIGS. 1 and 2 has the form of a composite glass panel or plate and comprises a wall-side or inner glass pane 1, a visible or outer glass pane 2 coextensive with the glass pane 1, and a layer 3 of a synthetic resin bonding material coextensive with both of the glass panes and bonding them together. At the side of the synthetic resin layer, i.e. along its inner surface, the visible or outer glass pane 2 is provided with an optically effective coating 4 which may impart reflectance to the panel and can be a coloring layer as will although any desired coloration can be imparted to the glass of the pane 2.

The wall side or inner glass pane 1 is formed with at least two bores 5, only one of which has been illustrated in FIGS. 1 and 2. The bores 5 are undercut at 6. In these bores 5, fastening elements 8 or metal are form fittingly received with bushings 7.

The wall-side glass pane i and the outer glass pane are preferably each composed of single-sheet safety glass.

Figures 3, 4:
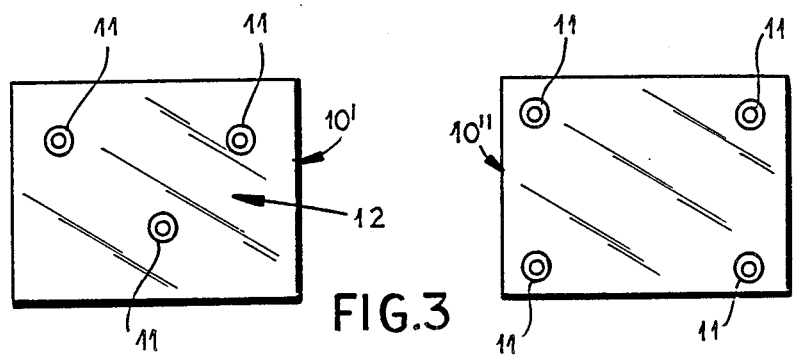
FIG. 3 is a rear view of a facade panel according to the invention.
FIG. 4 is a view similar to FIG. 3 of an alternative embodiment.

The undercut 6 has a frustoconical configuration like that of a countersink and, as can be seen in FIG. 3, has fastening assemblies 11 which may be provided in the panel 10' at location such that the three assemblies 11 form a statically determined fastening assembly 12.

Alternatively, as can be seen from the panel 10" in FIG. 4, the assemblies 11 can be provided at all four corners of the panel.

Preferably, the sleeve 7 is a synthetic resin bushing while the fastening element 8 is a screw having a frustoconical head 9 complementary to the undercut 6 through the intermediary of the sleeve 7.

A shank 9a extends out of the panel and projects rearwardly from the inner surface 1a of the inner pane so that it can threadedly engage a bracket 13, attached like a nut to the shank 9a and adapted to fit over the head 14 of a stud 15 projecting from the building structure or frame on which the panel is to be mounted.

I claim:

1. A facade plate, comprising:
   an outer visible glass pane;
   a layer of synthetic resin bonded to an inner surface face of said outer glass pane;
   an inner wall-side glass pane coextensive with said outer glass pane and bonded to said layer so that said glass panes and said layer form a composite laminated panel, said inner glass pane being formed with at least two spaced apart circular undercut bores directly therein;
   respective sleeves received in said bores; and
   respective metallic fastening elements traversing said sleeves and anchored with said sleeves in said inner gass pane while projecting from said inner glass pane to enable mounting of said composite laminated panel along an inner surface of said inner glass pane.

2. The facade plate defined in claim 1 wherein at least said inner wall-side glass pane is a single-sheet safety glass pane.

3. The facade plate defined in claim 1 wherein each of said bores is frustoconically convergent toward said inner surface of said inner glass pane from an outer surface of said inner glass pane bonded to said synthetic resin layer in the shape of a countersink.

4. The facade plate defined in claim 3 wherein said sleeves are synthetic resin bushings form fitting in said bores.

5. The facade plate defined in claim 4 wherein said elements are screws having frustoconical heads complementary to said bores and threaded shanks projecting inwardly from said inner surface of said inner glass pane.

6. The facade plate defined in claim 3 wherein said inner glass pane is provided with three of said bores, each having a respective one of said sleeves and a respective one of said elements forming a statically determined fastening assembly for mounting said composite panel.

7. The facade plate defined in claim 6 wherein said sleeves are synthetic resin bushings form fitting in said bores.

8. The facade plate defined in claim 7 wherein said elements are screws having frustoconical heads complementary to said bores and threaded shanks projecting inwardly from said inner surface of said inner glass pane.

9. The facade plate defined in claim 3 wherein said inner glass pane is rectangular and is provided with four of said bores, each having a respective one of said sleeves and a respective one of said elements at respective corners of said inner glass pane and forming a fastening assembly for mounting said composite panel.

10. The facade plate defined in claim 9 wherein said sleeves are synthetic resin bushings form fitting in said bores.

11. The facade plate defined in claim 10 wherein said elements are screws having frustoconical heads complementary to said bores and threaded shanks projecting inwardly from said inner surface of said inner glass pane.

* * * * *